(12) United States Patent
Guzmán López et al.

(10) Patent No.: US 11,957,085 B2
(45) Date of Patent: Apr. 16, 2024

(54) TREE TRIMMING WITH DRONE

(71) Applicant: AES Gener S.A., Santiago (CL)

(72) Inventors: Sergio Guzmán López, Santiago (CL); Cristian Madariaga Piombo, Santiago (CL); Felipe Mendoza Leyton, Santiago (CL); David Rebolledo Carvajal, Santiago (CL)

(73) Assignee: AES Gener S.A., Santiago (CL)

( * ) Notice: Subject to any disclaimer, the term of this patent is extended or adjusted under 35 U.S.C. 154(b) by 966 days.

(21) Appl. No.: 16/883,284

(22) Filed: May 26, 2020

(65) Prior Publication Data

US 2020/0367441 A1  Nov. 26, 2020

Related U.S. Application Data

(60) Provisional application No. 62/852,735, filed on May 24, 2019.

(51) Int. Cl.
| | |
|---|---|
| *A01G 3/08* | (2006.01) |
| *B64C 39/02* | (2023.01) |
| *B64D 1/02* | (2006.01) |
| *B64U 101/00* | (2023.01) |

(52) U.S. Cl.
CPC ............ *A01G 3/088* (2013.01); *B64C 39/024* (2013.01); *B64D 1/02* (2013.01); *B64U 2101/00* (2023.01); *B64U 2201/10* (2023.01); *B64U 2201/20* (2023.01)

(58) Field of Classification Search
CPC .............................. B64U 2101/40; H02G 1/02
See application file for complete search history.

(56) References Cited

U.S. PATENT DOCUMENTS

| | | |
|---|---|---|
| 4,455,815 A | 6/1984 | Grant |
| 5,722,223 A | 3/1998 | Walton |
| 9,420,748 B2 | 8/2016 | Chan et al. |
| | (Continued) | |

FOREIGN PATENT DOCUMENTS

| | | |
|---|---|---|
| CN | 201499481 U | 6/2010 |
| CN | 205623357 U | 10/2016 |
| | (Continued) | |

OTHER PUBLICATIONS

Search Report issued in Chilean Patent Application No. 202001365, dated Jun. 11, 2021, 3 pages.

*Primary Examiner* — Adam J Eiseman
*Assistant Examiner* — Jared O Brown
(74) *Attorney, Agent, or Firm* — HSML P.C.

(57) ABSTRACT

The present invention relates to a cutting device for fitting on an unmanned aerial vehicle for the high-level pruning of vegetation in areas close to power distribution lines, which includes at least one system for attachment to the aerial vehicle having a central beam, at least four arms having connection points to connect to rods of the unmanned aerial vehicle, the rods are oriented toward motors of the aerial vehicle for attachment to the aerial vehicle and a system for releasing at least one cutting tool whilst in use, and at least one cutting tool, made up of a plurality of saws each driven by a motor, a cutting rod for attaching the plurality of saws and an automatic leveling system for the cutting rod, which maintains the rod in a horizontal position during the cutting process.

35 Claims, 4 Drawing Sheets

(56) References Cited

U.S. PATENT DOCUMENTS

| | | | |
|---|---|---|---|
| 10,538,316 B2* | 1/2020 | Chen | B64C 39/024 |
| 10,561,071 B2* | 2/2020 | Hawkins | A01G 3/085 |
| 2017/0094909 A1 | 4/2017 | Bhavani | |
| 2021/0155344 A1* | 5/2021 | Mura | B64U 70/00 |
| 2022/0174932 A1* | 6/2022 | Ravanat | A01G 3/088 |

FOREIGN PATENT DOCUMENTS

| | | | | |
|---|---|---|---|---|
| CN | 106941944 | | 7/2017 | |
| CN | 108423175 A | * | 8/2018 | A01G 3/088 |
| CN | 207725612 U | * | 8/2018 | |
| CN | 208402581 U | | 1/2019 | |
| CN | 109601135 A | * | 4/2019 | A01D 46/30 |
| CN | 110301248 | | 10/2019 | |
| CN | 110383998 A | * | 10/2019 | B64C 27/08 |
| JP | 2019-162086 | | 9/2019 | |

* cited by examiner

TREE TRIMMING WITH DRONE

FIELD OF APPLICATION

The present invention concerns the field of the industrial maintenance of vegetation close to power distribution lines and relates in particular to the high-level pruning of trees using a cutting device and system fitted to an unmanned aerial device.

BACKGROUND

Tree pruning is considered one of the most dangerous activities related to maintenance tasks on power distribution lines, and is the major cause of death through direct or indirect contact with power lines.

This activity is classed as critical from a safety point of view. Therefore in most cases, tree pruning requires the line to be disconnected when the tree branches are close to the power line, affecting the availability of the power system and power quality to customers or end consumers. However, in these cases, tree pruning may be implemented using specialized tools such as motor saws and isolated trucks (live-line working) preventing flashovers from the power line to the operators. However, lines kept out of service and on-line work have an economic impact. First, they entail disconnecting users or loads (industries, homes, etc.) for some time. Second, they produce high risks and costs as work on live lines (equipment and tools) must be certified and tested regularly. From 2017 to 2018, TISC (AES Gener Transmission Interconnected System Center) spent over USD 400,000 on tree pruning, most of it carried out by disconnecting power lines owing to the proximity of tree branches to powered lines.

To avoid direct contact or work carried out a short distance from power lines, various technologies have been developed based on the use of a flying saw, without using specialized or expensive equipment, tools or trucks to eliminate thereby the risk of electrical contact.

To take advantage of stability, solutions have been proposed that use unmanned aerial vehicles to carry out said work. For example, document CN205623357 proposes a device based on an unmanned aerial vehicle which includes a frame, screw, actuation motor, support frame, pneumatic cylinder, actuation levers, cutting motor, cutting part, controller, actuation motor configured in the frame, screw and actuation motor assembly.

Another similar solution is disclosed in document CN110301248, which relates to an intelligent pruning system and method based on a drone, which comprises an intelligent monitoring system, an intelligent pruning system body, a power system and a control system.

The solution specified in document CN208402581 relates to an unmanned aerial vehicle which includes a plurality of fixed rotor arms and a plurality of rotor sub-assemblies. The upper side end of the fixed connection of the circumference on the body of the unmanned aerial vehicle is followed by a plurality of fixed rotor arms, the fixed connection of the rotor sub-assembly at the free end of the fixed rotor arm, a serial communication port which includes a cutting assembly.

Document CN106941944 discloses a flying robot for horticultural pruning which comprises an unmanned aerial vehicle, a pruning mechanism and a power supply, wherein the pruning mechanism is arranged on the unmanned aerial vehicle, and the power supply is used to supply power to the unmanned aerial vehicle and to the pruning mechanism; the pruning mechanism comprises a rotary knife, a pruning motor to control the rotation of the rotary knife and an angle control device to control the rotary knife so that it oscillates in vertical and horizontal directions. The pruning mechanism can be moved to any plant height by means of the unmanned aerial vehicle, and the rotary knife is then moved to prune the plants by controlling the pruning motor so that it operates, and most important, an angle of the rotary knife can be adjusted by means of the device.

The solution proposed by document U.S. Pat. No. 9,420,748 discloses an unmanned pruning vehicle, which comprises a pruning device configured to prune plant material from a plant, and a processing circuit configured to control the operation of the pruning device based on pruning data regarding a growing envelope for the plant.

Document US20170094909 discloses a system for harvesting produce from a tree which comprises has a drone capable of hovering, a video camera which gathers visual data of movement, a cutting implement, a remote control station with a screen, wireless circuitry and input mechanisms to control movement of the drone and operation of the cutting implement and circuitry in the body of the drone enabling two-way communication with the remote control station, transmission of video data from the video camera and response to commands from the remote control station.

Systems therefore exist that use unmanned aerial vehicles which seek to carry out tree pruning while making the process easier. However, the above solutions reveal a series of problems. In particular, the problem of leveling or controlling the level of the drone while the cutting tool is in operation, as this may produce destabilization, and is particularly sensitive in areas where distribution lines are present, is not overcome. Moreover, neither is a solution disclosed that allows the drone to be released if the cutting tool becomes entangled during the cutting process, which could lead to the loss of the unmanned aerial vehicle.

SUMMARY OF THE INVENTION

The present invention relates to a cutting device specially designed to be fitted to an unmanned aerial vehicle, in particular an industrial drone, in order to cut back vegetation, mainly in areas that are difficult to access with conventional machinery, mainly close to overhead power lines, whether medium voltage or high voltage.

The invention is based on incorporating a tool, in addition to other tools and methods for trimming vegetation used by gangs of electrical operators working on transmission and distribution systems, that significantly increases the range of action of said gangs allowing them to prune much taller trees than before and thus avoid exposure to the inherent risks of trimming. Moreover, the invention allows crews to avoid the inherent fatigue of handling trimming tools. It also gives crews a safe intervention option in emergencies (branches touching power lines), as said crews will be at a safe distance from areas of electrical danger, and also averts the risk of falls and accidents related to handling trimming tools. Furthermore, it allows trimming to be focused on the branches that pose a real risk to the transmission lines, thus reducing the risk of unnecessary damage to other species of trees.

Among the main benefits of the invention are the following:
 a) Completely eliminating the risks to people during the trimming process, as direct human intervention is not required. It also avoids the need to take personnel and equipment to difficult-to-access areas in and on trees in order to reach the branches that present a real risk to the power transmission networks.

b) Greatly improving power line availability, as disconnection times between lines are reduced since most of the work can be carried out while the electric circuits are live. In addition, when power lines have to be disconnected, all the earlier safety measures used with and for operators (electricity conductors, mechanisms for the locking/labeling systems) will no longer be necessary because said operators (people) will not be present in the area of electrical hazard.

c) Allowing the operator to approach cutting points more quickly and more safely, by allowing a remote view of the vegetation using monitoring cameras connected to the unmanned aerial vehicle and to the cutting system.

d) Reducing the cost of vegetation trimming work, as highly skilled personnel and their equipment (each with the respective management systems) will no longer be necessary. It also eliminates the need for specialized vehicles (trucks with a hydraulic lift system) and the logistics needed to operate and maintain them.

DETAILED DESCRIPTION OF THE INVENTION

The cutting system (100) and device (1) according to the present invention are designed to be fitted to an unmanned aerial vehicle (10), where said unmanned aerial vehicle may be an industrial drone, in order to approach highly complex access points.

Figure 1:
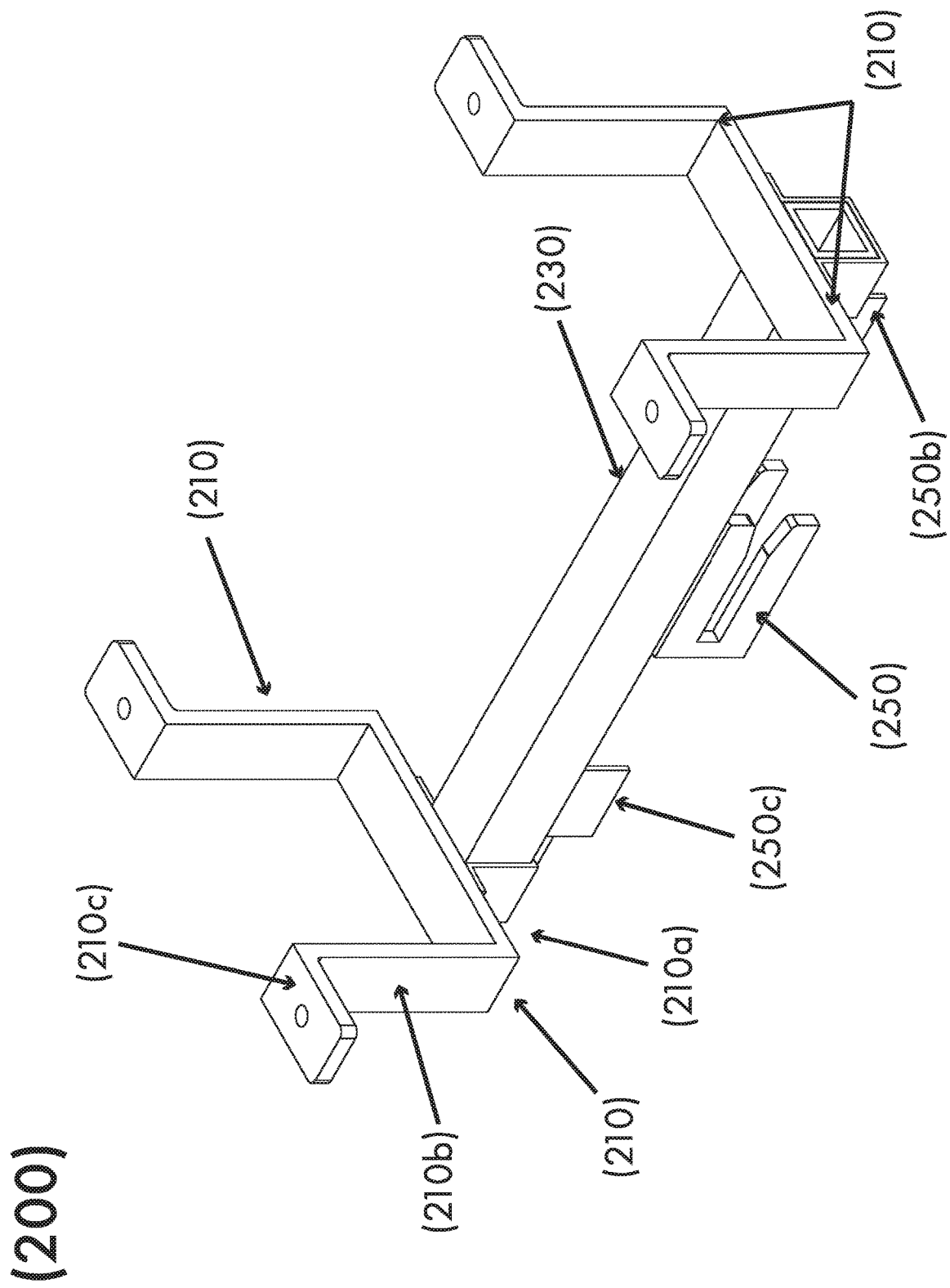
FIG. 1 is a view of the attachment system according to a preferred embodiment of the invention.
Figure 2:
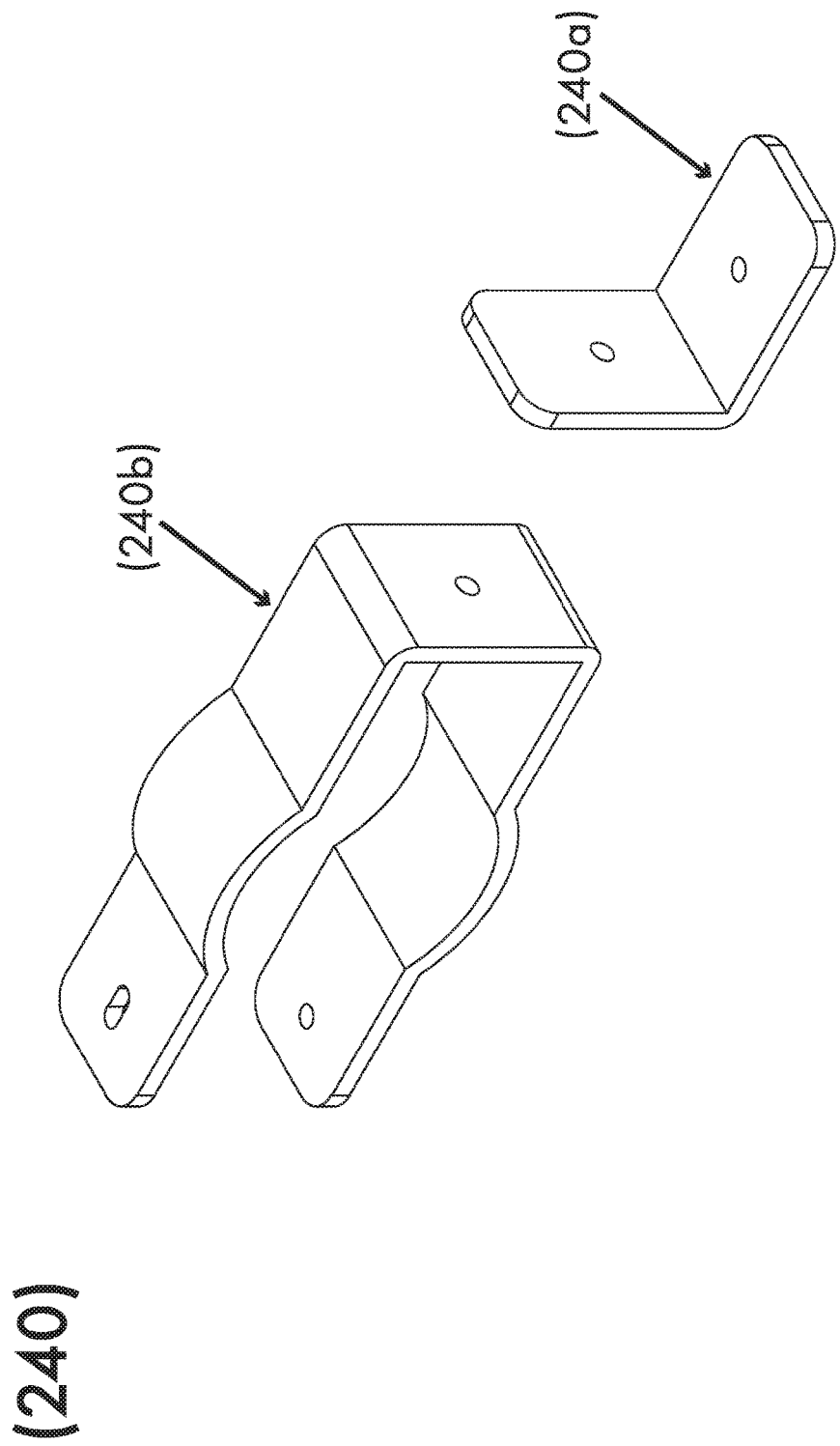
FIG. 2 is a view of a connection component for an arm of the drone according to a preferred embodiment of the invention.
Figure 3:
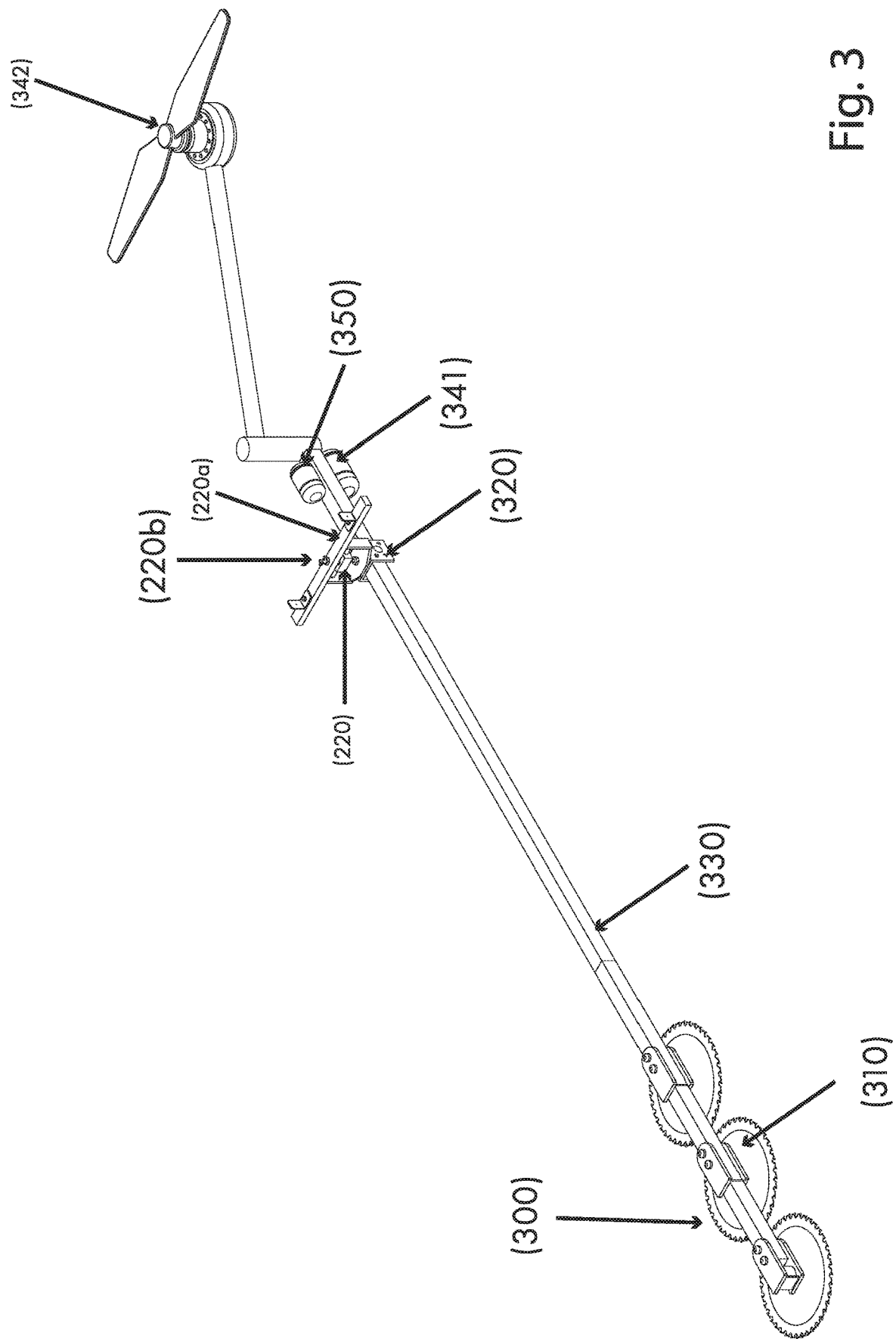
FIG. 3 is a view of the cutting tool and the associated components according to a preferred embodiment of the invention.
Figure 4:
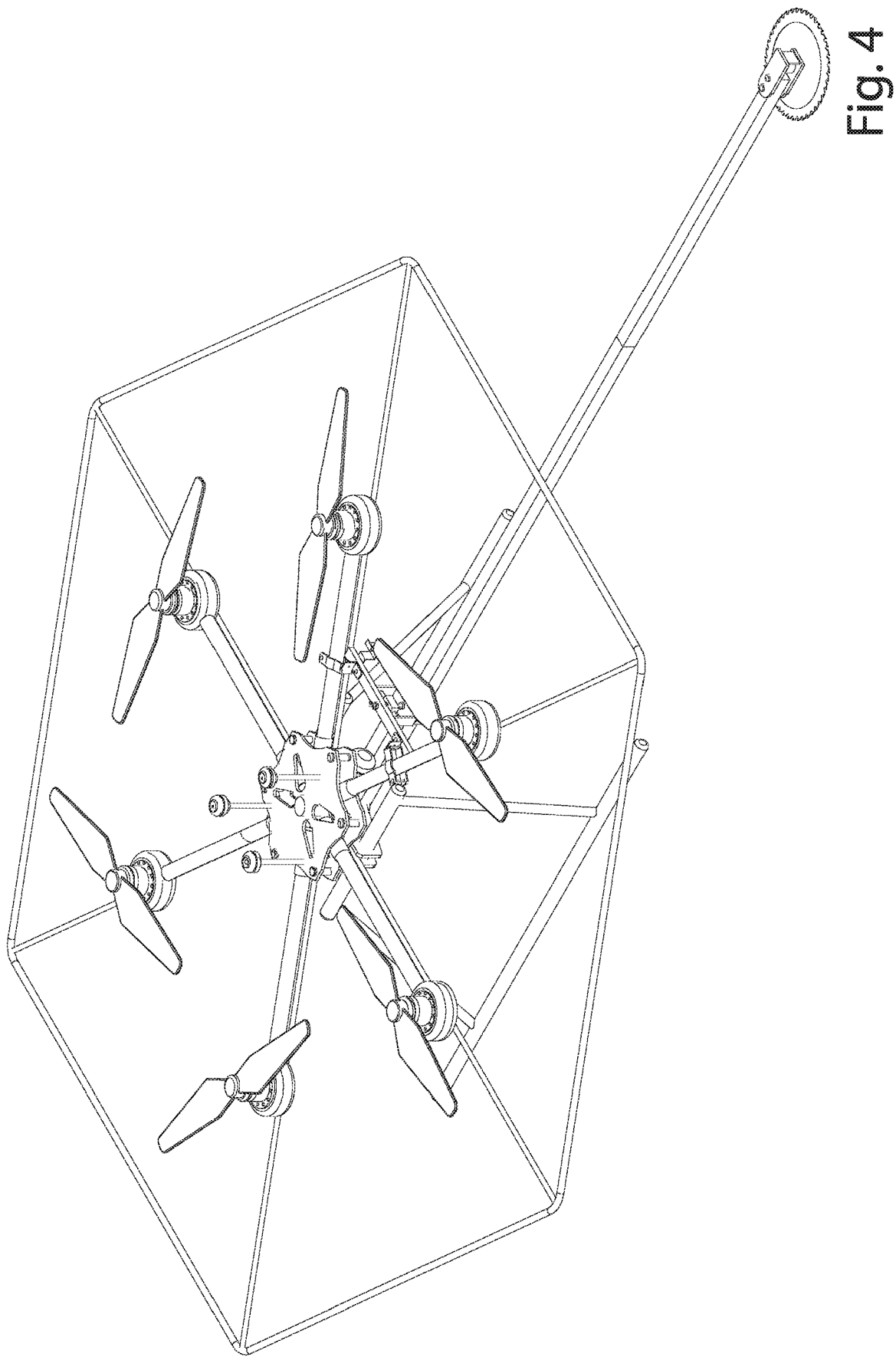
FIG. 4 is a view of the cutting system and device according to a preferred embodiment of the invention.

The cutting device (1) comprises at least one variable-geometry attachment system (200) for attachment to the unmanned aerial vehicle (10) (UAV), configured as a mechanical system for anchoring at least four arms (210) to the drive motors (11) of the aerial vehicle (10), with connection points to the variable-geometry rods of the drone (10), as shown in FIGS. 1 and 2. As can be seen in FIG. 1, the attachment system (200) comprises a central beam (230), wherein at each end of said central beam (230) two arms (210), opposite one another, extend outwards, each arm (210) being formed by an outward horizontal extension (210a), an upward vertical extension (210b) and a second outward horizontal extension (210c), which comprises at least one opening for connection by attachment means with a connection component (240) to an arm of the drone (10), which in turn comprises a connection point (240a) with a second extension of the arm (210c) and a clamping portion (240b), connected to the connection point (240) which is secured to the arm of the drone by a clamping portion at the other end (FIG. 2.)

On the lower central portion of the beam (230) a connection point (250) is arranged for connecting the base of the attachment system (200) to a cutting rod (330), which in turn has a rail for the release system (220) (FIG. 2.)

The function of the attachment system (200) is to act as a mechanical base for connecting at least one cutting tool (300) to the unmanned aerial vehicle (10). A portion of the attachment system (200) is removable, in which portion a release system (220) for at least one cutting tool (300) whilst in use is located. Said release system (220) is designed mainly to separate the cutting tool (300) from the unmanned aerial vehicle (10) in situations such as the cutting tool (300) becoming entangled in the vegetation that is being cut, or instability produced by the cutting tool (300) such as to prevent the unmanned aerial vehicle (10) from flying. Moreover, said release system (220) of the two portions which comprise the attachment system (200) facilitates access to the cutting tool (300) for transport, maintenance, exchange with other cutting tools, battery changes, etc.

The release system (220) is configured in two portions. The first portion of the release system (220) is fixed to the unmanned aerial vehicle (10) and consists of a system with three rails (250, 250a, 250b) where the second portion (220a), which is rigidly connected to a cutting tool (300), is fastened from below.

The first portion, the rail on the central connection point (250), just below the center of the unmanned aerial vehicle (10) has a square profile, with no lower face. On the side faces are opposed slots, where, on the left side, the slot is arranged from the center toward the rear and on the right side, the slot is arranged from the center toward the front. On the upper face of the profile of the central connection point (250) is a hole which allows both portions of the release system (220) to be aligned.

The second portion, which is rigidly connected to the cutting tool (300), has on its upper portion a metal platen (220a) which rotates by 90° on a vertical axis. In the open (or disengaged) position, the platen (220a) is collinear with the cutting tool (300) and with the side faces of the first portion of the release system (220), the axis of rotation has a downward extension which is inserted in the hole in the upper face of the first portion. When the second portion is fastened to the first portion, the platen (220a) rotates by 90° in a clockwise direction, actuated by a high-torque servomotor (220b), actuated in turn by radio by the copilot. The metal platen (220a) then fits into the slots in the side faces of the first portion (250). As long as both portions are fastened, the complete cutting tool assembly (300) is suspended from the metal platen. To unfasten both portions and release the cutting tool (300), the metal platen (220a) rotates by 90° in an anti-clockwise direction, actuated by the high-torque servomotor (220b), actuated in turn by radio by the copilot of the unmanned aerial vehicle (10). The platen (220a) comes out of both slots in the first portion (250) and allows the cutting tool to be released by the effect of gravity.

The system (100) also comprises at least one cutting tool (300), which in a preferred embodiment is made up of one to three (depending on the task conditions) 7¼-inch saws, each driven by a three-phase brushless electric motor (310). Said motors (310) are controlled by electronic drivers (Electronic Speed Controller, ESC). The drivers of the motors are in turn controlled from a multichannel radio frequency receiver (13). The radio receiver also controls the movement of a servomotor (320) which drives the system (220) for releasing/separating the cutting tool from the drone (10), allowing said cutting tool (300), should it unexpectedly become trapped in the vegetation, to be released/separated by the release system (220), leaving the drone (10) free of the cutting tool (300). The electric power for the cutting tool (300) and the mechanical release system (220) is supplied by lithium-ion polymer (LiPo) batteries, independent of the batteries that drive the unmanned aircraft (10).

The cutting tool (300) has an automatic leveling system (320) for a cutting rod (330), which maintains the horizontal position thereof. This is achieved by means of pivots with low friction bearings mounted on the load center of the cutting rod. The cutting rod (330) has a normal state of equilibrium, and corrections to movements that take said cutting rod out of its horizontal position are produced by drive modules (340) which may adjust or reverse the vertical and horizontal thrust at the end of the cutting rod (330) opposite the cutting disks. The drive module (340) is made up of three-phase brushless electric motors (341), which in turn actuate variable-pitch propellers (342). The pitch of the propellers (342) is controlled by servomotors which in turn are actuated by an electronic control system, which operates based on electronic gyroscopes and accelerometers, capable of detecting tilts and angular accelerations of the cutting tool. The fact that the cutting tool (300) can pivot at its center prevents said cutting tool from transferring too much rotational inertia to the drone (10).

The cutting tool (300) may also produce limited rotations on a vertical axis to facilitate the pruning action when the aircraft (10) is static (in hover mode) close to the point where pruning is to take place, and the cutting rod (330) can rotate in a horizontal plane (left-right) and cut vegetation without the need to move the drone (10). The tool (300) pivots on a horizontal rotation mechanism mounted on a low-friction bearing. The impulse for the rotary movement comes from another drive module controlled by the same electronic control system that keeps the cutting rod horizontal (but performing functions on a vertical axis).

The system (220) for releasing the cutting tool (300) is controlled by radio control actuated by a ground operator (copilot). When the release system (220) is actuated, the radio control sends an order over the servomotor of the release system (220), resulting in the mechanical disconnection of the cutting tool (330), and releasing said cutting tool by the effect of gravity from the attachment system (200). The same radio control signal in turn generates an order for the motors (310) that actuate the cutting saws to decelerate, in order to reduce risk. The electronic drivers, the radio frequency receiver and the batteries are arranged in an electric control unit (350) positioned close to one end of the cutting rod (330).

The cutting saws are switched on and their speed controlled by multichannel radio control actuated by a ground operator (copilot). This allows the cutting saws to be switched on, their speed to be controlled, and a stop request to be issued to an electric deceleration system. The horizontal movement (left-right) actuation order is issued by radio control actuated by a ground operator (copilot), which acts on the electronic stabilization system for the cutting rod, which in turn acts on the servomotors of the drive modules. Finally, this makes possible the angular changes required to perform the cutting work.

Owing to the extra weight and rotational inertia added to the unmanned aircraft (10) as a result of the attachment (200) and the cutting tool (300) systems, the gains characteristic of the aircraft flight control system must be modified to greatly improve the dampening of the oscillations produced during any translation movement. The cameras and their stabilization systems (gimbals) must also be repositioned owing to the installation of the base of the attachment system.

The invention claimed is:

1. A cutting device to the fitted to an unmanned aerial vehicle for pruning of vegetation, wherein the cutting device comprises at least one attachment system for attachment to the unmanned aerial vehicle; the attachment system having a central beam, at least four arms having connection points to connect to rods oriented toward motors of the unmanned aerial vehicle for attachment to the unmanned aerial vehicle, and a release system for at least one cutting tool, wherein said at least one cutting tool comprises a plurality of saws each driven by a motor, a cutting rod for attaching the plurality of saws and an automatic leveling system for the cutting rod, the automatic leveling system maintains said cutting rod in a horizontal position during a cutting process.

2. The cutting device according to claim 1, wherein the cutting device further comprises a plurality of batteries which supply electric power for the at least one cutting tool and the release system.

3. The cutting device according to claim 1, wherein the central beam includes ends, and at each end of the central beam two opposite arms that form the at least four arms extend outwards.

4. The cutting device according to claim 3, wherein each arm of the at least four arms is formed by an outward horizontal extension, an upward vertical extension and a second outward horizontal extension, and each of the second outward horizontal extensions comprises at least one opening.

5. The cutting device according to claim 4, wherein the cutting device further comprises a connection component which comprises a connection point and a clamping portion, the connection point is connected to the second outward horizontal extension of one of the arms, the clamping portion is connected to the connection point at one end and the clamping portion is secured to a corresponding one of the rods of the unmanned aerial vehicle.

6. The cutting device according to claim 1, wherein on a lower central portion of the central beam a connection point is arranged on a base thereof for attachment to the cutting rod, and the base has a rail for the release system.

7. The cutting device according to claim 4, wherein the release system is configured with two portions, wherein a first portion of the two portions of the release system is fixed to the unmanned aerial vehicle, and the first portion includes a system of three rails; and wherein a second portion of the two portions is rigidly connected to the cutting tool.

8. The cutting device according to claim 7, wherein one rail of the three rails is below a center of the unmanned aerial vehicle and has a square profile with no lower face, wherein the one rail has opposite slots on side faces thereof; on a left side of the square, profile one of the slots is arranged from the center of the unmanned aerial vehicle toward a rear of the unmanned aerial vehicle and on a right side of the square profile one of the slots is arranged from the center of the unmanned aerial vehicle toward a front of the unmanned aerial vehicle, and at an upper face of the one rail is a hole that allows both of the first and second portions of the release system to be aligned.

9. The cutting device according to claim 8, wherein the second portion has on an upper portion thereof a metal platen which rotates by 90° about a vertical axis.

10. The cutting device according to claim 9, wherein in an open or disengaged position of the metal platen, the metal platen is collinear with the at least one cutting tool and with the side faces of the one rail, the vertical axis extends through the hole in the upper face of the one rail.

11. The cutting device according to claim 10, wherein when the second portion is fastened to the first portion, the metal platen rotates by 90° in a clockwise direction, actuated by a servomotor, and the servomotor is actuatable by radio by a copilot.

12. The cutting device according to claim 11, wherein to unfasten both of the first and second portions and release the cutting tool, the metal platen rotates by 90° in an anti-clockwise direction, actuated by the servomotor, and the metal platen comes out of both of the opposite slots of the one rail and allows the at least one cutting tool to be released by the effect of gravity.

13. The cutting device according to claim 1, wherein the plurality of saws comprises from two to three saws and each saw is driven by a three-phase electric motor.

14. The cutting device according to claim 13, wherein each of the three-phase electric motors are controlled by electronic drivers controlled from a multichannel radio frequency receiver.

15. The cutting device according to claim 14, wherein the multichannel radio frequency receiver also controls movement of a servomotor which drives the release system for releasing/separating the at least one cutting tool from the unmanned aerial vehicle.

16. The cutting device according to claim 1, wherein the automatic leveling system comprises bearings mounted on a load center of the cutting rod.

17. The cutting device according to claim 16, wherein the cutting device further comprises drive modules to correct movements that take the cutting rod out of the horizontal position, wherein said drive modules comprise three-phase electric motors, and the three-phase electric motors actuate variable-pitch propellers of the unmanned aerial vehicle.

18. A cutting system for pruning of vegetation, wherein the cutting system comprises:
an unmanned aerial vehicle, wherein the unmanned aerial vehicle comprises a plurality of drive motors; and
a cutting device which comprises at least one attachment system for attachment to the unmanned aerial vehicle; the attachment system having a central beam, at least four arms having connection points to connect to rods oriented toward the drive motors of the unmanned aerial vehicle for attachment to the unmanned aerial vehicle, and a release system for at least one cutting tool; wherein said at least one cutting tool comprises a plurality of saws each driven by a motor, a cutting rod for attaching the plurality of saws and an automatic leveling system for the cutting rod, the automatic leveling system maintains said cutting rod in a horizontal position during a cutting process.

19. The cutting system according to claim 18, wherein the attachment system comprises the release system separating the at least one cutting tool from the unmanned aerial vehicle.

20. The cutting system according to claim 18, wherein the cutting system further comprises a plurality of batteries that supply electric power for the at least one cutting tool and the release system.

21. The cutting system according to claim 18, wherein the central beam includes ends, and at each end of the central beam two opposite arms that form the at least four arms extend outwards.

22. The cutting system according to claim 21, wherein each arm of the at least four arms is formed by an outward horizontal extension, an upward vertical extension and a second outward horizontal extension, each of the second outward horizontal extensions comprises at least one opening.

23. The cutting system according to claim 21, wherein the cutting system further comprises a connection component which comprises a connection point and a clamping portion, the connection point is connected to the second outward horizontal extension of one of the arms, the clamping portion is connected to the connection point at one end and the clamping portion is secured to a corresponding one of the rods of the unmanned aerial vehicle.

24. The cutting system according to claim 18, wherein on a lower central portion of the central beam a connection point is arranged on a base thereof for attachment to the cutting rod, and the base has a rail for the release system.

25. The cutting system according to claim 24, wherein the release system is configured in two portions, wherein a first portion of the two portions of the release system is fixed to the unmanned aerial vehicle, and the first portion includes a system of three rails; wherein a second portion of the two portions is rigidly connected to the cutting tool.

26. The cutting system according to claim 25, wherein one of the three rails is below a center of the unmanned aerial vehicle and has a square profile, with no lower face, wherein the one rail has opposite slots on side faces thereof; on a left side of the square profile one of the slots is arranged from the center of the unmanned aerial vehicle toward a rear of the unmanned aerial vehicle and on a right side of the square profile one of the slots is arranged from the center of the unmanned aerial vehicle toward a front of the unmanned aerial vehicle, and at an upper face of the one rail is a hole that allows both of the first and second portions of the release system to be aligned.

27. The cutting system according to claim 26, wherein the second portion has, on an upper portion thereof, a metal platen which rotates by 90° about a vertical axis.

28. The cutting system according to claim 27, wherein in an open or disengaged position of the metal platen, the metal platen is collinear with the at least one cutting tool and with the side faces of the one rail, the vertical axis extends through the hole in the upper face of the one rail.

29. The cutting system according to claim 28, wherein when the second portion is fastened to the first portion, the metal platen rotates by 90° in a clockwise direction, actuated by a servomotor, and the servomotor is actuatable by radio by a copilot.

30. The cutting system according to claim 20, wherein to unfasten both of the first and second portions and release the cutting tool, the metal platen rotates by 90° in an anti-clockwise direction, actuated by the servomotor, and the metal platen comes out of both of the opposite slots of the one rail and allows the at least one cutting tool to be released by the effect of gravity.

31. The cutting system according to claim 18, wherein the plurality of saws comprises from two to three saws and each saw is driven by a three-phase electric motor.

32. The cutting system according to claim 31, wherein the three-phase electric motors are controlled by electronic drivers controlled from a multichannel radio frequency receiver.

33. The cutting system according to claim 32, wherein the multichannel radio frequency receiver also controls movement of a servomotor which drives the release system for releasing/separating the at least one cutting tool from the unmanned aerial vehicle.

34. The cutting system according to claim 18, wherein the automatic leveling system comprises bearings mounted on a load center of the cutting rod.

35. The cutting system according to claim 34, wherein the cutting system further comprises drive modules for correcting movements that take the cutting rod out of the horizontal position, wherein said drive modules comprise three-phase electric motors, and the three-phase electric motors actuate variable-pitch propellers of the unmanned aerial vehicle.

\* \* \* \* \*